United States Patent
Lee et al.

(10) Patent No.: US 10,804,560 B2
(45) Date of Patent: Oct. 13, 2020

(54) UNIT CELL FOR SECONDARY BATTERY WITH IMPROVED WETTABILITY AND METHOD FOR MANUFACTURING THE SAME

(71) Applicant: LG CHEM, LTD., Seoul (KR)

(72) Inventors: Sang-Kyun Lee, Daejeon (KR); Ju-Hyeon Cho, Daejeon (KR); Duck-Hoe Kim, Daejeon (KR); Cha-Hun Ku, Daejeon (KR)

(73) Assignee: LG CHEM, LTD., Seoul (KR)

( * ) Notice: Subject to any disclaimer, the term of this patent is extended or adjusted under 35 U.S.C. 154(b) by 57 days.

(21) Appl. No.: 16/066,757

(22) PCT Filed: Sep. 26, 2017

(86) PCT No.: PCT/KR2017/010646
§ 371 (c)(1),
(2) Date: Jun. 28, 2018

(87) PCT Pub. No.: WO2018/070701
PCT Pub. Date: Apr. 19, 2018

(65) Prior Publication Data
US 2019/0027777 A1    Jan. 24, 2019

(30) Foreign Application Priority Data

Oct. 10, 2016 (KR) .................. 10-2016-0130780
Sep. 25, 2017 (KR) .................. 10-2017-0123465

(51) Int. Cl.
*H01M 10/04* (2006.01)
*H01M 2/14* (2006.01)
(Continued)

(52) U.S. Cl.
CPC ....... *H01M 10/0459* (2013.01); *H01M 2/145* (2013.01); *H01M 2/168* (2013.01);
(Continued)

(58) Field of Classification Search
CPC .......................... H01M 2/1673; H01M 2/168
See application file for complete search history.

(56) References Cited

U.S. PATENT DOCUMENTS

2011/0308457 A1* 12/2011 Simor ............... H05H 1/2406
118/719
2014/0363729 A1   12/2014 Kim et al.
(Continued)

FOREIGN PATENT DOCUMENTS

KR     2002-0011491 A    2/2002
KR     10-2012-0111078 A  10/2012
(Continued)

OTHER PUBLICATIONS

Machine Translation of KR 20160028730 A (Oct. 21, 2019) (Year: 2019).*
(Continued)

*Primary Examiner* — Matthew J Merkling
(74) *Attorney, Agent, or Firm* — Birch, Stewart, Kolasch & Birch, LLP

(57) ABSTRACT

A unit cell for a secondary battery includes a central electrode having a first polarity, a pair of separators respectively laminated on both surfaces the central electrode, and an upper electrode and a lower electrode respectively laminated on the pair of separators and having a second polarity, wherein the separator has a patterned adhesive force.

12 Claims, 3 Drawing Sheets

(51) Int. Cl.
  *H01M 2/16*  (2006.01)
  *H01M 2/36*  (2006.01)
  *H01M 10/0525*  (2010.01)

(52) U.S. Cl.
  CPC .............. *H01M 2/36* (2013.01); *H01M 10/04* (2013.01); *H01M 10/045* (2013.01); *H01M 10/049* (2013.01); *H01M 2/1686* (2013.01); *H01M 10/0404* (2013.01); *H01M 10/0525* (2013.01)

(56) References Cited

U.S. PATENT DOCUMENTS

| | | | |
|---|---|---|---|
| 2014/0377631 A1* | 12/2014 | Park | H01M 2/168 429/144 |
| 2015/0228951 A1 | 8/2015 | Yu et al. | |
| 2015/0263324 A1* | 9/2015 | Lee | H01M 2/1646 429/145 |
| 2015/0357671 A1* | 12/2015 | Park | H01M 10/0583 429/217 |
| 2018/0034028 A1* | 2/2018 | Jung | H01M 2/10 |
| 2019/0221808 A1* | 7/2019 | Honda | H01M 10/0583 |

FOREIGN PATENT DOCUMENTS

| | | |
|---|---|---|
| KR | 10-2015-0051901 A | 5/2015 |
| KR | 10-1578265 B1 | 12/2015 |
| KR | 10-2016-0028730 A | 3/2016 |
| KR | 10-1625602 B1 | 5/2016 |
| KR | 20160109408 A | 9/2016 |
| WO | 02073714 A2 | 9/2002 |

OTHER PUBLICATIONS

Machine Translation of KR 20160109408 A (Oct. 21, 2019) (Year: 2019).*
Supplementary European Search Report issued in EP Application No. 17859633 dated Jan. 8, 2019.
International Search Report (PCT/ISA/210) issued in PCT/KR2017/010646, dated Jan. 11, 2018.

* cited by examiner

UNIT CELL FOR SECONDARY BATTERY WITH IMPROVED WETTABILITY AND METHOD FOR MANUFACTURING THE SAME

TECHNICAL FIELD

The present disclosure relates to a cell for a secondary battery with improved wettability and a method for manufacturing the same, and more particularly, to a cell for a secondary battery with improved wettability by adjusting an adhesive force between a separator and an electrode and a method for manufacturing the same.

The present application claims priority to Korean Patent Application No. 10-2016-0130780 filed on Oct. 10, 2016 in the Republic of Korea, the disclosures of which are incorporated herein by reference.

The present application claims priority to Korean Patent Application No. 10-2017-0123465 filed on Sep. 25, 2017 in the Republic of Korea, the disclosures of which are incorporated herein by reference.

BACKGROUND ART

In a conventional polymer cell manufacturing processes, bi-cells are laminated at a constant temperature/pressure for better process efficiency, so that the wettability at the interface between an electrode and a separator is lowered.

In other words, when an adhesive force at the interface between the electrode and the separator is constant so that the electrode and the separator are completely uniformly adhered as a whole, an electrolyte may not easily permeate between the electrode and the separator, and thus the secondary battery may not give full performance.

In particular, under the same process conditions, the adhesive force at the interface between the positive electrode and the separator is stronger, and thus the wettability tends to be more lowered thereat. For this reason, the performance of the secondary battery is degraded more seriously thereat.

In addition, if the adhesive force at the interface between the electrode and the separator is uniformly high as above, the gas generated in a formation process performed during the secondary battery manufacturing procedure may not smoothly discharged. Also, if the gas is not smoothly discharged, a lithium plating phenomenon may occur.

DISCLOSURE

Technical Problem

The present disclosure is designed to solve the problems of the related art, and therefore the present disclosure is directed to providing a unit cell used for manufacturing a secondary battery, in which there is a region having a weak adhesive force between an electrode and a separator or not bonded to improve the wettability of an electrolyte, and in which a gas generated in a secondary battery during a formation process is smoothly discharged.

However, the technical problem to be solved by the present disclosure is not limited to the above, and other objects not mentioned herein will be understood from the following description by those skilled in the art.

Technical Solution

In one aspect of the present disclosure, there is provided a unit cell for a secondary battery, comprising: a central electrode having a first polarity; a pair of separators respectively laminated on both surfaces the central electrode; and an upper electrode and a lower electrode respectively laminated on the pair of separators and having a second polarity, wherein the separator has a patterned adhesive force.

The separator may include: a first region having a first adhesive force; and a second region having an adhesive force lower than the first adhesive force.

The first region may be a region treated with plasma, and the second region may be a region not treated with plasma.

Meanwhile, in another aspect of the present disclosure, there is also provided a method for manufacturing a unit cell for a secondary battery, comprising: supplying a central electrode; supplying separators onto both surfaces of the central electrode; treating the surfaces of the separators with plasma, so that a partial region is treated with plasma and the other region is not treated with plasma; supplying an upper electrode and a lower electrode onto the separator; and laminating the central electrode, the upper electrode, the lower electrode and the separators so that the central electrode, the upper electrode and the lower electrode are respectively adhered to the separators.

The laminating step may include: applying heat onto the upper electrode and the lower electrode; and applying pressure onto the heated upper and lower electrodes to be compressed.

The method for manufacturing a unit cell for a secondary battery may further include cutting the central electrode, the upper electrode, the lower electrode and the separator into predetermined lengths.

The method for manufacturing a unit cell for a secondary battery may further include inspecting and discharging the completely laminated unit cell for a secondary battery.

Advantageous Effects

According to an embodiment of the present disclosure, the wettability of the electrolyte at the interface between the electrode and the separator is improved to enhance the performance of the secondary battery.

According to another embodiment of the present disclosure, in the formation process during the secondary battery manufacturing procedure, it is possible to smoothly remove the gas generated inside the secondary battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, with reference to FIGS. 1 to 4, a structure of a unit cell for a secondary battery according to an embodiment of the present disclosure will be described.

Figure 1:
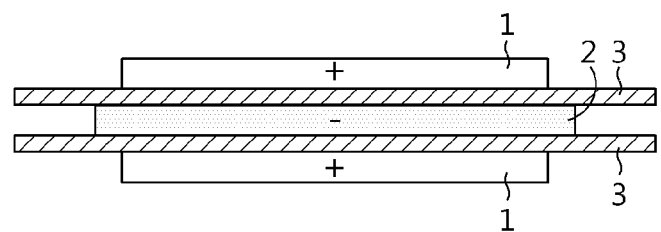
FIGS. 1 and 2 are diagrams showing a cell for a secondary battery according to an embodiment of the present disclosure.
Figure 2:
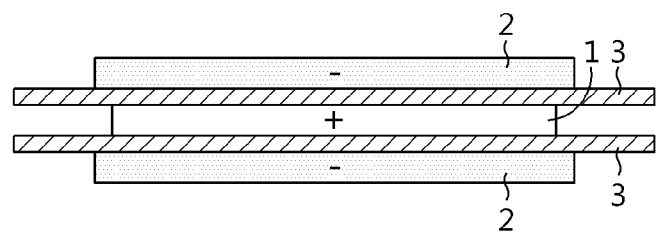
Figure 3:
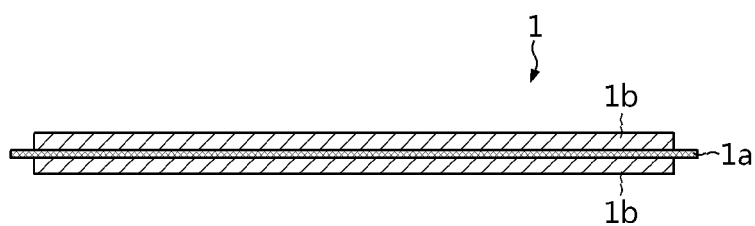
FIGS. 3 and 4 are diagrams showing positive electrode and a negative electrode, employed at the unit cell for a secondary battery according to an embodiment of the present disclosure.
Figure 4:
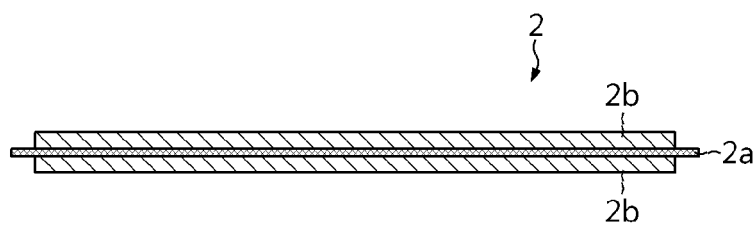

FIGS. 1 and 2 are diagrams showing a cell for a secondary battery according to an embodiment of the present disclosure, and FIGS. 3 and 4 are diagrams showing positive electrode and a negative electrode, employed at the unit cell for a secondary battery according to an embodiment of the present disclosure.

Referring to FIGS. 1 and 2, the unit cell for a secondary battery according to an embodiment of the present disclosure includes a central electrode having a first polarity, a pair of separators 3 respectively laminated on both surfaces of the central electrode, and an upper electrode and a lower electrode respectively laminated on the pair of separators and having a second polarity opposite to the first polarity.

A unit cell in which electrodes located at the outermost sides have the same polarity as described above is generally called a bi-cell.

The unit cell of a bi-cell type may be classified into a positive electrode type bi-cell in which an upper electrode and a lower electrode are positive electrodes 1 and a central electrode is a negative electrode 2 as shown in FIG. 1, and a negative electrode type bi-cell in which the upper electrode and the lower electrode are negative electrodes 2 and the central electrode is a positive electrode 1 as shown in FIG. 2.

A secondary battery prepared using the bi-cell may be configured so that a positive electrode type bi-cell and a negative electrode type bi-cell are alternately stacked with a separator being interposed therebetween. The bi-cells may be stacked by means of a simple stacking method, a stacking and folding method, or the like.

The positive electrode 1 applied to the unit cell for a secondary battery according to an embodiment of the present disclosure includes a positive electrode current collector 1a and a positive electrode active material 1b laminated on the surface thereof, as shown in FIG. 3.

The positive electrode current collector 1a may be a foil made of aluminum, nickel, or a combination thereof.

The positive electrode active material 1b may employ common positive electrode active materials available as a positive electrode of a secondary battery in the art, and, for example, may be selected from $LiCoO_2$, $LiNiO_2$, $LiMnO_2$, $LiMn_2O_4$, $Li(Ni_aCo_bMn_c)O_2$ ($0<a<1$, $0<b<1$, $a+b+c=1$), $LiNi_{1-Y}Co_YO_2$, $LiCo_{1-Y}Mn_YO_2$, $LiNi_{1-Y}Mn_YO_2$ (here, $0 \le Y<1$), $Li(Ni_aCo_bMn_c)O_4$ ($0<a<2$, $0<b<2$, $a+b+c=2$), $LiMn_{2-Z}Ni_ZO_4$, $LiMn_{2-Z}Co_ZO_4$ (here, $0<Z<2$), $LiCoPO_4$, $LiFePO_4$ and mixtures thereof, without being limited thereto.

In addition, the negative electrode 2 applied to the unit cell for a secondary battery according to an embodiment of the present disclosure includes a negative electrode current collector 2a and a negative electrode active material 2b laminated on the surface thereof, as shown in FIG. 4.

The negative electrode current collector 2a may be a foil made of stainless steel, nickel, copper, titanium or alloys thereof.

The negative electrode active material 2b may employ common negative electrode active materials available as a negative electrode of a secondary battery in the art, and, for example, may be selected from carbon such as hard graphitized carbon, graphite carbon; metal composite oxides such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, elements in Group 1, Group 2 and Group 3 in the periodic table, halogen; $0<x \le 1$; $1 \le y \le 3$; $1 \le z \le 8$); lithium metals; lithium alloys; silicon-based alloys; tin-based alloys; oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$ or the like; conductive polymers such as polyacetylene; Li—Co—Ni-based materials and the like, without being limited thereto.

Meanwhile, the separator 3 interposed between the positive electrode 1 and the negative electrode 2 may include a porous coating layer formed on one or both surfaces of a porous polymer substrate.

The porous polymer substrate used in the separator 3 is not particularly limited as long as it is a planar porous polymer substrate which is usually applied to a secondary battery. The porous polymer substrate may be made of any material selected from the group consisting of a low density polyethylene, a linear low density polyethylene, a polyethylene terephthalate, a high density polyethylene, a propylene homopolymer, a polypropylene random copolymer, a polylbutene, a poly4-methyl-1-pentene, an ethylene-propylene random copolymer, an ethylene-1-butene random copolymer, a propylene-1-butene random copolymer, polyethylene terephthalate, polybutylene terephthalate, polyester, polyacetal, polyamide, polycarbonate, polyimide, polyetherether ketone, polyarylether ketone, polyetherimide, polyamideimide, polybenzimidazole, polyether sulfone, polyphenylene oxide, cyclic olefin copolymer, polyphenylene sulfide, polyethylene naphthalene, and mixtures thereof. The porous polymer substrate may be in the form of a film or a nonwoven fabric.

The porous coating layer is formed on one side or both sides of the porous polymer substrate, and inorganic particles are connected and fixed by means of a binder polymer for the porous coating layer. Also, pores in a micrometer size are formed in the porous coating layer due to interstitial volume among the inorganic particles.

The binder polymer for the porous coating layer is not particularly limited as long as it has an excellent bonding strength with the inorganic particles and is not easily dissolved by the electrolyte. The binder polymer for the porous coating layer may be any compound selected from the group consisting of polyvinylidene fluoride-co-hexafluoro propylene (PVDF-co-HFP), polyvinylidene fluoride-co-trichloro ethylene, polyvinylidene fluoride-co-chlorotrifluoro ethylene, polymethyl methacrylate, polyacrylonitrile, polyvinyl pyrrolidone, polyvinyl acetate, polyethylene-co-vinyl acetate, polyethylene oxide, cellulose acetate, cellulose acetate butyrate, cellulose acetate propionate, cyanoethyl pullulan, cyanoethylpolyvinylalcohol, cyanoethyl cellulose, cyanoethyl sucrose, pullulan, carboxyl methyl cellulose (CMC), acrylonitrile-styrene-butadiene copolymer, polyimide, polyvinylidene fluoride, polyacrylonitrile, styrene butadiene rubber (SBR), and mixtures thereof, without being limited thereto.

Meanwhile, in the unit cell for a secondary battery according to an embodiment of the present disclosure, the adhesive force is not uniform in the entire interface between the positive electrode 1 and the separator 3 and/or the interface between the negative electrode 2 and the separator 3, but the unit cell has a patterned adhesive force. In other words, the interface between the electrode 1, 2 and the separator 3 has different adhesive forces at various regions so that the electrode 1, 2 and the separator 3 are adhered with different strengths at various regions. A method for forming such a patterned adhesive force will be described below in detail with reference to FIGS. 5 and 6.

Next, with reference to FIGS. 5 to 7, a method for manufacturing a unit cell according to an embodiment of the present disclosure will be described.

Figure 5:
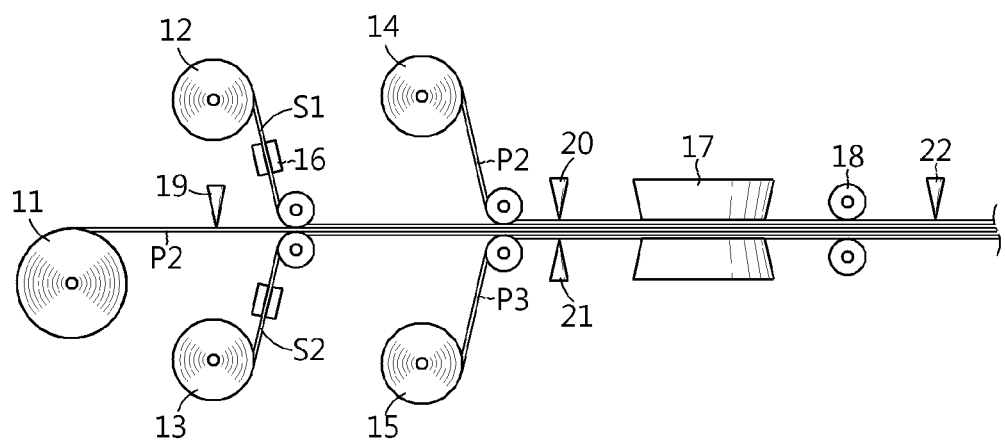
FIG. 5 is a schematic view showing a facility for manufacturing the unit cell for a secondary battery according to the present disclosure.
Figure 6:
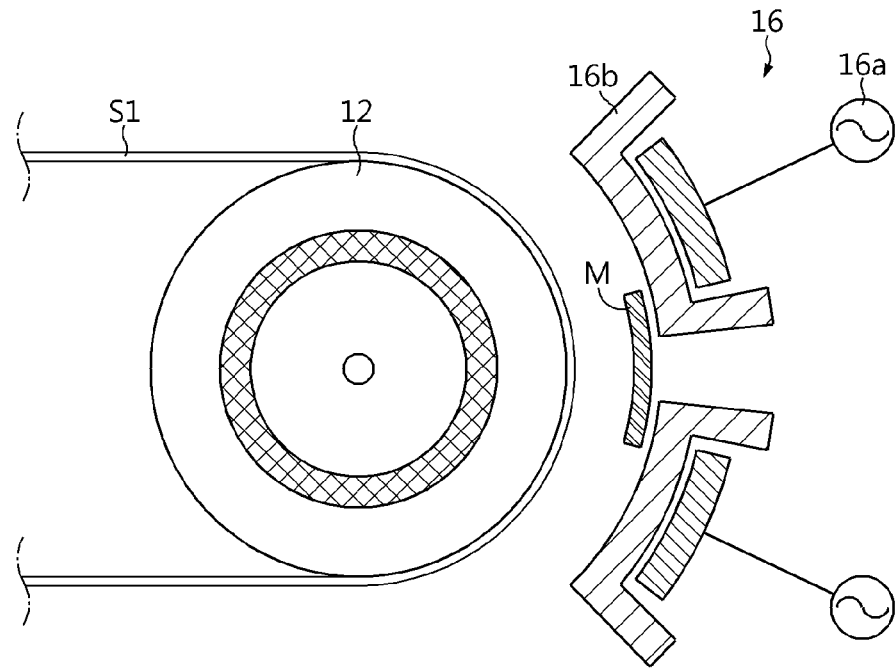
FIG. 6 is a diagram showing a plasma treatment device used for manufacturing the unit cell for a secondary battery according to an embodiment of the present disclosure.
Figure 7:
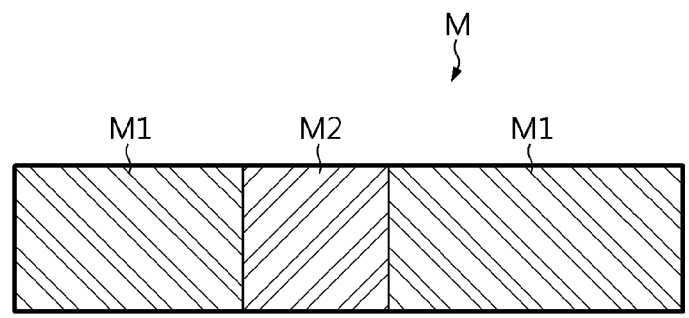
FIG. 7 is a diagram showing a mask applied to the plasma treatment device depicted in FIG. 6.

FIG. 5 is a schematic view showing a facility for manufacturing the unit cell for a secondary battery according to the present disclosure, FIG. 6 is a diagram showing a plasma treatment device used for manufacturing the unit cell for a secondary battery according to an embodiment of the present disclosure, and FIG. 7 is a diagram showing a mask applied to the plasma treatment device depicted in FIG. 6.

First, referring to FIG. 5, the method for manufacturing a unit cell according to an embodiment of the present disclosure includes supplying a central electrode P1, supplying separators S1, S2, performing a plasma treatment, supplying an upper electrode P2 and a lower electrode P3, and performing lamination.

In the step of supplying a central electrode P1, a central electrode P1 in the form of a long fabric wound on a central electrode feeding roll 11 is provided.

In the step of supplying separators S1, S2, separators S1, S2 in the form of a long fabric respectively wound on separator feeding rolls 12, 13 are provided onto both surfaces of the central electrode P1.

In the step of performing a plasma treatment, the surfaces of the separators S1, S2 are treated with plasma by using a plasma treatment device 16 to increase an adhesive force with the electrodes P1, P2, P3 through the surface reformation of the separators S1, S2, so that a partial region of the surfaces of the separators S1, S2 is treated with plasma and the other region is not treated with plasma to perform a patterned plasma treatment.

In the step of supplying an upper electrode P2 and a lower electrode P3, an upper electrode P2 and a lower electrode P3 in the form of a long fabric are provided onto the plasma-treated separator S1, S2 by using the electrode feeding roll 14, 15.

In the step of performing lamination, a laminate composed of the lower electrode P2, the separator S2, the central electrode P1, the separator S1 and the upper electrode P1 stacked in order from the bottom is marinated so that interfaces between the electrode and the separator adjacent to each other are adhered. The step of performing lamination includes a heating step of applying a heat onto the upper electrode P2 and the lower electrode P3 placed on the separator S1, S2 by using a heater 17 and a compressing step of compressing each electrode and each separator by applying a pressure onto the heated upper electrode P2 and the heated lower electrode P3 by using a lamination roll 18.

Meanwhile, the method for manufacturing a unit cell for a secondary battery may further include cutting the supplied electrodes P1, P2, P3 and the supplied separators S1, S2 in the form of a long fabric into a predetermined length by using cutters 19, 20, 21, 22.

In addition, though not shown in the figures, the method for manufacturing a unit cell for a secondary battery may also further include inspecting and discharging the completely laminated unit cell for a secondary battery.

Here, the step of inspecting the unit cell is to inspect whether an align material is present between the electrode and the separator and whether the unit cell is manufactured with an accurate size, during the lamination process for manufacturing the unit cell.

Meanwhile, referring to FIGS. 6 and 7, the configuration of the plasma treatment device is shown in more detail. In other words, referring to FIG. 6, the plasma treatment device employed in the present disclosure includes a power source 16a and an electrode unit 16b, and a mask M is provided between the electrode unit 16b and the separator S1 in order to perform a patterned plasma treatment.

Referring to FIGS. 6 and 7, the mask M is composed of a first region M1 through which plasma is able to pass and a second region M2 through which plasma is not able to pass, so that a partial region of the surface of the separator S1 is treated with plasma and the other region is not treated with plasma.

In other words, in the surface of the separator S1, a portion facing the first region M1 during the plasma treatment is surface-reformed by means of the plasma treatment to have a strong adhesion with the electrode during the lamination process, but a portion facing the second region is not treated with plasma to have a relatively weak adhesion with the electrode during the lamination process. However, the pattern of the mask M depicted in FIG. 7 is just an example, and the mask M may have various patterns to implement a patterned adhesive force.

As described above, the interface between the separator S1 and the electrode, treated with plasma by using the mask M, includes a region with a strong adhesive force and a region with a relatively weak adhesive force. When a secondary battery is manufactured using the unit cell, a case is filled with an electrolyte together with the unit cell. Here, since the unit cell according to an embodiment of the present disclosure has a region having a relatively weak adhesive force between the separator and the electrode, an electrolyte may be impregnated fast through the region having a relatively weak adhesive force as above, which may lead to improved performance of the secondary battery.

Meanwhile, conditions for manufacturing the unit cell for a secondary battery according to the present disclosure are as follows:

1. (Information of a used separator):

An SRS separator prepared using a fabric made of PP material (composition: $PVDF+Al_2O_3$) is used.

2. (Conditions for plasma treatment):

Plasma treatment is performed with the conditions of 2 to 4.5 kV, 10 to 30 kHz.

3. (Experiment for proving the effect obtained by the plasma treatment):

In a state where the prepared bi-cell is immersed in an electrolyte up a predetermined depth (5 mm or less), the heights of regions wet by the electrolyte at various locations are compared.

Figure 8:
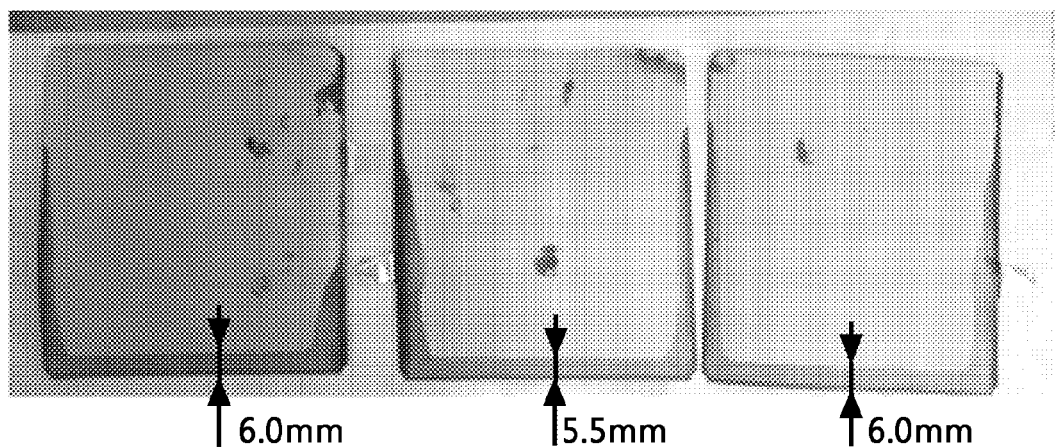
FIG. 8 is a diagram showing a wettability test result of a conventional unit cell for a secondary battery.
Figure 9:
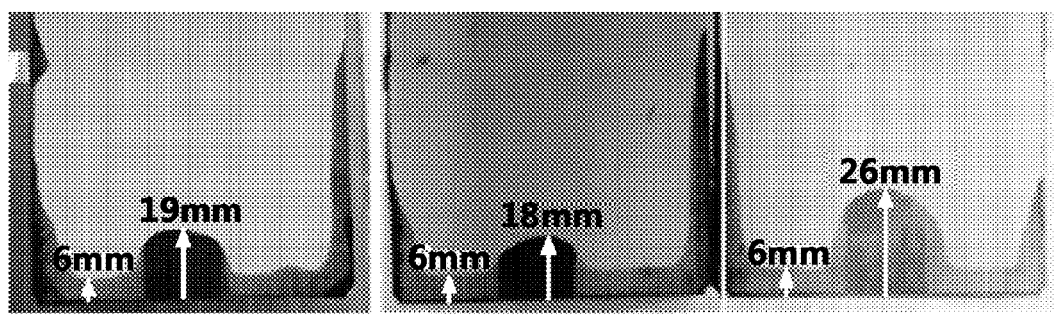
FIG. 9 is a diagram showing a wettability test result of the unit cell for a secondary battery according to an embodiment of the present disclosure.

If the diagrams depicted in FIGS. 8 and 9 representing wettability are compared, it can be understood that a conventional unit cell for a secondary battery (FIG. 8) and the unit cell for a secondary battery according to an embodiment of the present disclosure (FIG. 9) exhibit a greatly difference in wettability.

In other words, in the electrolyte impregnation experiment using the conventional unit cell, the electrolyte impregnation occurs to a height of about 5.5 mm to 6.0 mm from the bottom (FIG. 8), but in the electrolyte impregnation experiment using the unit cell according to an embodiment of the present disclosure, it can be found that a region where the electrolyte is impregnated to a height of about 6 mm from the bottom and a region where the electrolyte is impregnated much higher (about 18 mm to 26 mm from the bottom) exist together.

As described above, the region where the electrolyte is impregnated higher is not treated with plasma by means of masking during the plasma treatment process and thus corresponds to a region where the interface between the electrode and the separator interface has a lower adhesive force in comparison to surrounding regions.

In other words, bonding between substances may be classified into chemical adhesion and mechanical interlocking. Here, the improved adhesive force obtained by plasma treatment as in the present disclosure is a result of the reinforcement of a chemical adhesive force. The chemical adhesion is classified into electrostatic attraction, chemical absorption, chemical bonding and the like. Here, if a part of the surface of the separator is treated with plasma as in the present disclosure, the region treated with plasma is surface-reformed to change, for example, a bonding structure such as C—H, C=C and C—C into a bonding structure such as C—O, C=O, O—C—O and O—C=O, which reinforces the electrostatic attraction, the chemical absorption, the chemical bonding and the like. Meanwhile, the region not treated with plasma has a relatively lower adhesive force, which improves the impregnation of electrolyte in the corresponding region.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A unit cell for a secondary battery, the unit cell comprising:
    a central electrode having a first polarity;
    a pair of separators respectively laminated on opposite surfaces of the central electrode, and including a first separator and a second separator; and
    an upper electrode and a lower electrode respectively laminated on the first separator and the second separator, and located as outermost layers of the unit cell, the upper electrode and the lower electrode having a second polarity,
    wherein, at an interface between the upper electrode and the first separator and at an interface between the lower electrode and the second separator, each of the first separator and the second separator has a patterned adhesive force having a first region with a first adhesive force and a second region with a second adhesive force that is weaker than the first adhesive force.

2. The unit cell for a secondary battery according to claim 1, wherein the first region is a region treated with plasma, and the second region is a region not treated with plasma.

3. A method for manufacturing a unit cell for a secondary battery, the method comprising:
    supplying a central electrode;
    supplying first and second separators respectively onto opposite surfaces of the central electrode;
    treating surfaces of each of the first and second separators with plasma, so that a first region of the surfaces is treated with plasma and a second region of the surfaces is not treated with plasma;
    supplying an upper electrode and a lower electrode respectively onto the first separator and the second separator; and
    laminating the central electrode, the upper electrode, the lower electrode and the first and second separators so that the central electrode, the upper electrode and the lower electrode are respectively adhered to the first separator and the second separator, and the upper electrode and the lower electrode are located as outermost layers of the unit cell,
    wherein, at an interface between the upper electrode and the first separator and at an interface between the lower electrode and the second separator, each of the first separator and the second separator has a patterned adhesive force having the first region with the first adhesive force and the second region with the second adhesive force that is weaker than the first adhesive force.

4. The method for manufacturing a unit cell for a secondary battery according to claim 3, wherein the laminating step includes,
    applying heat onto the upper electrode and the lower electrode; and
    applying pressure onto the heated upper and lower electrodes to be compressed.

5. The method for manufacturing a unit cell for a secondary battery according to claim 3, further comprising:
    cutting the central electrode, the upper electrode, the lower electrode the first separator and the second separator into predetermined lengths.

6. The method for manufacturing a unit cell for a secondary battery according to claim 3, further comprising:
    inspecting and discharging the completely laminated unit cell for a secondary battery.

7. The unit cell for a secondary battery according to claim 1, further comprising electrolyte,
    wherein the electrolyte is impregnated higher in the second region than the first region.

8. The unit cell for a secondary battery according to claim 7, wherein the electrolyte is impregnated to about 18 mm to 26 mm from a bottom of the second region.

9. The method for manufacturing a unit cell for a secondary battery according to claim 3, further comprising electrolyte,
    wherein the electrolyte is impregnated higher in the second region than the first region.

10. The method for manufacturing a unit cell for a secondary battery according to claim 9, wherein the electrolyte is impregnated to about 18 mm to 26 mm from a bottom of the second region.

11. The unit cell for a secondary battery according to claim 1, wherein the number of separators is the same as the total number of upper and lower electrodes.

12. The method for manufacturing a unit cell for a secondary battery according to claim 3, wherein the number of separators is the same as the total number of upper and lower electrodes.

* * * * *